United States Patent

Scholl et al.

[11] Patent Number: 5,916,942
[45] Date of Patent: Jun. 29, 1999

[54] COATED POLYCARBONATE MOLDINGS

[75] Inventors: Thomas Scholl, Bergisch Gladbach; Peter Bier, Krefeld; Wolfgang Nising, Sankt Augustin, all of Germany

[73] Assignee: Bayer AG, Germany

[21] Appl. No.: 08/705,923

[22] Filed: Aug. 29, 1996

Related U.S. Application Data

[63] Continuation of application No. 08/547,710, Oct. 19, 1995.

[30] Foreign Application Priority Data

Oct. 28, 1994 [DE] Germany ............... 44 38 543

[51] Int. Cl.$^6$ ............... C08K 5/07; B32B 27/36

[52] U.S. Cl. ............... 524/359; 428/412

[58] Field of Search ............... 524/359; 428/412

[56] References Cited

U.S. PATENT DOCUMENTS

| | | | |
|---|---|---|---|
| 3,399,169 | 8/1968 | Horton | 524/336 |
| 3,548,005 | 12/1970 | Milionis et al. | 568/333 |
| 4,180,493 | 12/1979 | Selbeck et al. | 524/359 |
| 4,184,994 | 1/1980 | Mark et al. | 524/359 |
| 4,576,864 | 3/1986 | Krautter et al. | 428/328 |
| 5,306,456 | 4/1994 | Suhadolnik et al. | 428/412 |

FOREIGN PATENT DOCUMENTS

| | | |
|---|---|---|
| 0110221 | 6/1984 | European Pat. Off. . |
| 0149182 | 7/1985 | European Pat. Off. . |
| 1593750 | 12/1970 | Germany . |

*Primary Examiner*—Kriellion S. Morgan
*Attorney, Agent, or Firm*—Connolly & Hutz

[57] ABSTRACT

The invention relates to coated moldings of polycarbonates with a coating (A) against the effect of UV radiation and, optionally a coating (B) to prevent the formation of droplets.

19 Claims, No Drawings

COATED POLYCARBONATE MOLDINGS

This application is a continuation of Ser. No. 8,547,710 filed Oct. 19, 1995.

This invention relates to coated moldings of thermoplastic, aromatic polycarbonates which are characterized in that the coating (A) itself consists of a thermoplastic, aromatic polycarbonate with a thickness of 1 μm to 200 μm and preferably 1 μm to 50 μm which contains 4% by weight to 20% by weight and preferably 5% by weight to 15% by weight of a compound corresponding to formula (I):

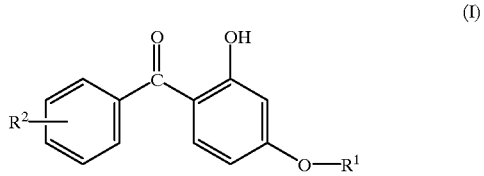

in which $R^1$ is $C_{18-30}$ alkyl and $R^2$ is H or $C_{1-12}$ alkyl

The present invention also relates to a process for the production of the coated moldings which is characterized in that the molding and the coating (A) are produced together by coextrusion.

Another coating (B) consisting of silica, another metal oxide or a mixture of both and having a thickness of 0.01 μm to 20 μm, preferably 0.01 μm to 5 μm and more preferably 0.01 μm to 1 μm may optionally be applied to the coating (A).

Accordingly, the present invention also relates to coated moldings of thermoplastic, aromatic polycarbonates which are characterized in that they contain a coating (A) of a thermoplastic, aromatic polycarbonate with a thickness of 1 μm to 200 μm and preferably 1 μm to 50 μm which contains 4% by weight to 20% by weight and preferably 5% by weight to 15% by weight of a compound corresponding to formula (I):

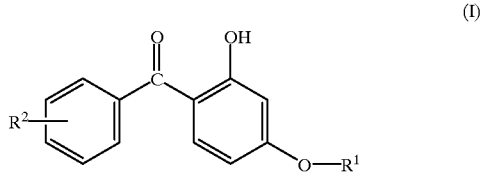

in which $R^1$ is $C_{18-30}$ alkyl and $R^2$ is H or $C_{1-12}$ alkyl, and a second coating (B) of silica, another metal oxide or a mixture of both with a thickness of 0.01 μm to 20 μm, preferably 0.01 μm to 5 μm and more preferably 0.01 μm to 1 μm is applied to coating (A)

Coating (B) is applied to layer (A) of the polycarbonate molding coated in accordance with the invention by applying colloidal solutions of the silica or of other metal oxides or of a mixture of both in water or organic solvents to coating (A) and concentrating the solution thus applied by evaporation, i.e. drying the coating thus applied, at temperatures of 20° C. to 140° C.

Accordingly, the present invention also relates to a process for the production of the moldings of thermoplastic, aromatic polycarbonate coated with layers (A) and (B) in accordance with the invention, characterized in that the molding of polycarbonate is coextruded together with coating (A), after which coating (B) is applied to coating (A) using colloidal solutions of silica or of other metal oxides or of a mixture of both in water or organic solvents and the solution thus applied is concentrated by evaporation at temperatures of 20° C. to 140° C.

By virtue of the presence of coating (A), the moldings of thermoplastic, aromatic polycarbonates coated in accordance with the invention are effectively protected against UV rays and, by virtue of the additional coating (B), if any, have a surface which, on wetting of water, shows a water-spreading effect, i.e. suppresses the formation of water droplets.

Accordingly, coating (A) may be used as a highly effective coating to protect polycarbonate moldings against light although it may also be used as a coupling layer for a second water-spreading layer (B) of silica, another metal oxide or a combination of both.

EP 110 221 describes a process for coating polycarbonate sheets with layers of plastics containing at least 3% by weight of a UV absorber, for example 2-hydroxy-4-n-octoxybenzophenone, by single-layer coextrusion. Unfortunately, the volatility of the UV absorbers available at that time was too high for practical purposes.

DE-OS 1 694 273 describes polycarbonate moldings with a coating of polycarbonate applied from an organic solvent. The coatings may contain 0.01 to 20% by weight, based on the total weight of the solution, of hydroxybenzophenone derivatives. The hydroxybenzophenones mentioned in this document are also too volatile for single-layer coextrusion and, accordingly, lead to irregularities in the surface of the molding and to blockage of the calibrator nozzles as a result of evaporation losses.

Accordingly, due to the absence of suitable low-volatility UV absorbers, a second surface layer free from UV absorber was co-extruded with fairly considerable effort in practice so that even the volatile UV absorbers known at the time could be used in the underlying layer, cf. DE 3 244 953, Accordingly, many attempts have been made in the past to develop low-volatility and, at the same time, highly effective UV absorbers. Thus, EP 141 140 describes polymeric UV absorbers of very low volatility which, unfortunately, were attended by disadvantages in their light-stabilizing effect by comparison with the benztriazole systems otherwise typically used in polycarbonate.

In addition, EP 0 320 632 (Le A 25 600) describes the use of special dimeric benztriazole derivatives for the single-layer coextrusion of polycarbonate. Advantages of these compounds include their high compatibility combined with their high effectiveness. These compounds enabled optimally light-stabilized PC sheets to be produced for the first time in practice by the single-layer coextrusion process. Unfortunately, the expense involved in the production of these compounds was a disadvantage, adding to the cost of the production process.

It has surprisingly been found that the compounds (I) according to the invention are superior to known systems in their light-stabilizing effect and are eminently suitable for single-layer coextrusion.

U.S. Pat. No. 4,576,864 describes a process for the water-spreading coating of plastics which is characterized in that a polar, non-water-swellable polymer is applied to a thermoplastic substrate and then coated with a metal sol (silica sol) solution, followed by drying. This process has the disadvantage in relation to the invention that the coating process takes place in two stages and, accordingly, is expensive to integrate in a continuous production process.

EP 378 855 describes a process for the water-spreading treatment of plastics which is characterized in that a metal sol (silica sol) is applied to a plastic from organic solvent and concentrated by evaporation. The process described in this document has the disadvantage in relation to the process according to the invention that it involves the use of organic solvents which could cause stress cracking in sensitive plastics.

EP 493 781 (Le A 28 139) describes polyether block polycarbonates for the water-spreading coating of plastics. By virtue of its thermoplastic character, the polyether block polycarbonate is suitable in principle for continuous extrusion onto plastics, but unfortunately lacks the necessary thermal and hydrolytic stability for this purpose.

Preferred compounds corresponding to formula (I) are, for example,

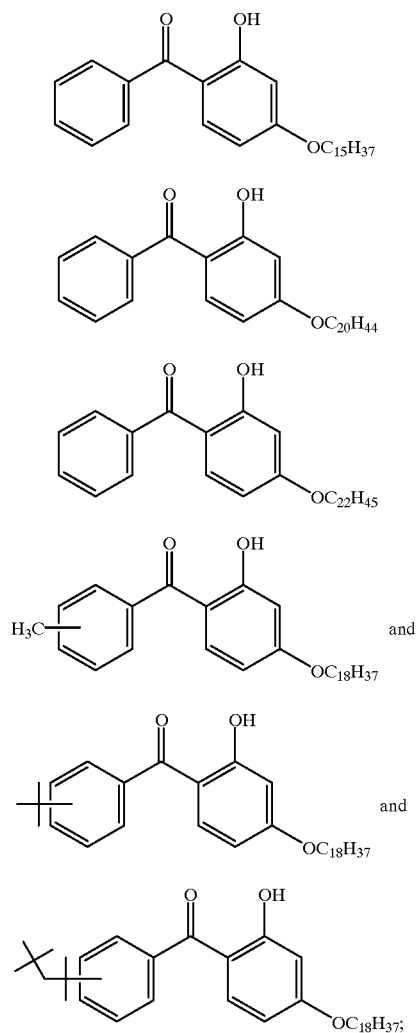

The following compounds are particularly preferred:

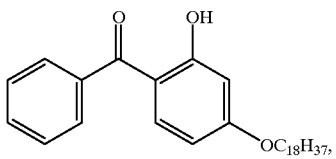

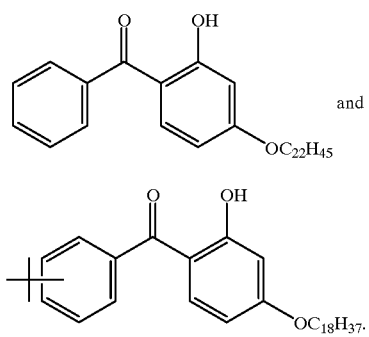

Corresponding hydroxybenzophenone derivatives may be prepared by known methods Their production is described, for example, in DE-OS 1 768 599.

Thermoplastic aromatic polycarbonates in the context of the present invention are both homopolycarbonates and copolycarbonates, the polycarbonates may be linear or branched in known manner.

The polycarbonates to be coated in accordance with the invention are produced in known manner from diphenols, carbonic acid derivatives, optionally chain terminators and optionally branching agents.

Particulars of the production of polycarbonates have been recorded for about 40 years in numerous patent specifications, cf. for example Schnell, "Chemistry and Physics of Polycarbonates", Polymer Reviews, Volume 9, Interscience Publishers, New York/London/Sydney 1964; D. Freitag, U. Grigo, P. R. Huller, H. Nonvertue, BAYER AG, "Polycarbonates" in Encyclopedia of Polymer Science and Engineering, Volume 11, Second Edition, 1988, pages 648–718 and, finally, Dres. U. Grigo, K. Kirchner and P. R. Müller "Polycarbonate" in Becker/Braun, Kunststoff-Handbuch, Vol. 3/1, Polycarbonate, Polyacetale, Polyester, Celluloseester, Carl Hanser Verlag, München/Wien 1992, pages 117–299.

Diphenols suitable for the production of the polycarbonates to be coated in accordance with the invention are, for example, hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)sulfones, bis-(hydroxyphenyl)-sulfoxides, α,α'-bis-(hydroxyphenyl)-diisopropyl benzenes and nucleus-alkylated and nucleus-halogenated compounds thereof.

Preferred diphenols are 4,4'-dihydroxydiphenyl, 2,2-bis-(4-hydroxyphenyl)-propane, 2,4-bis-(4-hydroxyphenyl)-2-methyl butane, 1,1-bis-(4-hydroxyphenyl)-p-diisopropyl benzene, 2,2-bis-(3-methyl-4-hydroxyphenyl) -propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) -sulfone, 2,4-bis-(3,5-dimethyl-4-hydroxyphenyl)-2-methyl butane, 1,1-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-3,3,5-trimethyl cyclohexane.

Particularly preferred diphenols are 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethyl cyclohexane.

These and other suitable diphenols are described, for example, in U.S. Pat. Nos. 3,028,635, 2,999,835, 3,148,172, 2,991,273, 3,271,367, 4,982,014 and 2,999,846, in DE-OSS 1 570 703, 2 063 050, 2 036 052, 2 211 956 and 3 832 396, in FR-PS 1 561 518, in H. Schnell "Chemistry and Physics of Polycarbonates", Interscience Publishers, New York, 1964 and in published Japanese patent applications 62039/1986, 62040/1986 and 105550/1986.

In the case of the homopolycarbonates, only one diphenol is used whereas, in the case of the copolycarbonates, several diphenols are used.

Suitable carbonic acid derivatives are, for example, phosgene or diphenyl carbonate.

Suitable chain terminators are both monophenols and monocarboxylic acids. Suitable monophenols are phenol itself, alkylphenols, such as cresols, p-tert.butylphenol, p-n-octylphenol, p-isooctylphenol, p-n-nonylphenol and p-isononylphenol, halophenols, such as p-chlorophenol, 2,4-dichlorophenol, p-bromophenol and 2,4,6-tribromophenol.

Suitable monocarboxylic acids are benzoic acid, alkyl-benzoic acids and halobenzoic acids.

Preferred chain terminators are phenols corresponding to formula (IV):

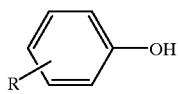

(IV)

in which
R is a branched or unbranched $C_8$ and/or $C_9$ alkyl radical.

The quantity of chain terminator to be used is 0.1 mole-% to 5 mole-%, based on moles of diphenols used. The chain terminators may be added before, during or after the phosgenation step.

Suitable branching agents are the trifunctional or more than trifunctional compounds known in polycarbonate chemistry, more particularly those containing three or more than three phenolic OH groups.

Examples of suitable branching agents are phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-(4',4"-dihydroxytriphenyl)-methyl)-benzene and also 2,4-dihydroxybenzoic acid, trimesic acid, cyanuric chloride and 3,3-bis-(3-methyl-4-hydroxyphenyl)-2-oxo-2,3-dihydroindole.

The quantity of branching agent optionally used is from 0.05 mole-% to 2 mole-%, again based on moles of diphenols used.

The branching agents may either be initially introduced together with the diphenols and the chain terminators in the aqueous alkaline phase or may be added in the form of a solution in an organic solvent before the phosgenation step. In the case of the transesterification process, the branching agents are used together with the diphenols.

All these measures for the production of the starting polycarbonates are familiar to the expert.

The molecular weights $\overline{M}w$ (weight average molecular weights, as determined by gel chromatography) of the thermoplastic aromatic polycarbonates to be coated in accordance with the invention are in the range from 10,000 to 100,000 and preferably in the range from 15,000 to 50,000.

The production of moldings of these polycarbonates is known.

The thermoplastic, aromatic polycarbonates suitable for coating (A) correspond to those defined above for the moldings of thermoplastic, aromatic polycarbonates to be coated.

The compounds corresponding to formula (I) are incorporated in the thermoplastic, aromatic polycarbonates intended for coating (A) preferably by mixing in the melt at temperatures in the range from 220 to 350° C., although they may also be incorporated by dissolving the components in chlorobenzene and/or methylene chloride and evaporating the solutions together in an evaporation extruder at 160 to 340° C.

The materials for coating (B) are prepared from metal oxide sols, ie. aqueous colloidal dispersions of amorphous metal oxides, such as silica for example, with particle sizes of 1 to 100 nm. Examples of other suitable metal oxides are the oxides of zinc, aluminium, zirconium, chromium and tin. Silica and aluminium oxide or mixtures thereof are most particularly preferred.

The metal oxide sols are anionically or cationically stabilized by surface charges. They are generally aqueous colloidal solutions although colloidal solutions of, for example, silica in organic solvents, such as isopropanol, ethylene glycol, propylene glycol, acetone, diacetone alcohol, methyl ethyl ketone, propylene glycol methyl ether, dimethyl formaldehyde, etch, may also be used.

Examples of suitable silica sols are anionic silica sols with a specific surface of 100 to 300 $m^2/g$ and cationic silica sols modified with aluminium salts with specific surfaces of 100 to 300 $m^2/g$. Corresponding silica sols are commercially available (for example Levasil®, a product of Bayer AG).

The solids content of the metal oxide sols is between 0.1% by weight and 5% by weight.

The metal oxide sols are applied to coating (A) in this dilute form.

In the interests of better wetting, it is advisable to add suitable surfactants. One example of a suitable surfactant is the adduct of 7 moles of ethylene oxide with 1 mole of linseed oil fatty acid. The metal sol is applied from this dilute surfactant-containing solution in such a way that the resulting coating appears thin and coherent The metal sols may be applied by existing techniques, more particularly by knife coating, dip coating, casting, etc. The drying step may be carried out at room temperature or at elevated temperature (up to about 140° C.) and is preferably carried out at 70 to 120° C.

Polycarbonate moldings of any kind may be provided with the coatings according to the invention. Examples are double-walled panels and solid panels for glazing purposes, more particularly in greenhouse construction, winter gardens, garage roofs, industrial glazing, etc., sunglasses, visors for motorcycle helmets, etc. The production of corresponding moldings is known per se.

The coatings may be provided either with coating (A) only or with both coatings (A) and (B).

Particularly suitable moldings are coextruded double-walled panels with a 1 μm to 50 μm thick coating (A) which are obtained by coextrusion at temperatures of 220° C. to 320° C. Particulars of corresponding window profiles or double-walled panels can be found, for example, in EP-A-0 054 856.

EXAMPLE 1

Granular bisphenol A polycarbonate (eta–rel=1.315, as measured on a solution of 0.5 g polycarbonate in 100 ml methylene chloride at room temperature) is mixed with 10% by weight of 2-hydroxy-4-octadecyloxybenzophenone and the resulting mixture is processed in a twin-screw extruder at 300° C. to form homogeneous granules.

A double-walled panel is then produced at 290° C., using the above-mentioned granules to produce a 50 μm thick outer layer and a branched aromatic polycarbonate (eta–rel.=1.315, as measured on a solution of 0.5 g of polycarbonate in 100 ml methylene chloride at room temperature) as the base material.

COMPARISON A

Production as in Example 1, but using 10% by weight of p-methoxybenzylidene malonic acid neopentyl glycol polyester (Example B 1 of EP 141 140).

COMPARISON B

Production as in Example 1, but using 10% by weight of a dimeric benztriazole methylene-bis-(2-hydroxy-5-tert.octyl phenyl benztriazole) in accordance with EP 0 320 632 (compound (I)).

Testing of weather resistance:

The double-walled panels thus produced are weathered in a xenon Weather-o-meter using the humid/dry cycle (102:18). Yellowing (yellowness index) and transmission are then measured.

Yellowness index

|  | 0 h | 1000 h | 2000 h | 3000 h |
|---|---|---|---|---|
| Example 1 | 2.3 | 1.2 | 2.3 | 2.9 |
| Comparison A | 1.8 | 1.8 | 7.7 | 6.7 |
| Comparison B | 2.4 | 1.8 | 3.9 | 4.1 |

Transmission:

|  | 0 h | 1000 h | 2000 h | 3000 h |
|---|---|---|---|---|
| Example 1 | 80.6 | 81.0 | 80.1 | 79.4 |
| Comparison A | 80.1 | 80.9 | 77.7 | 77.7 |
| Comparison B | 80.2 | 80.4 | 78.7 | 79.3 |

EXAMPLE 2

Water-spreading coating

A 3% solution of a silica sol with a specific surface of 300 m²/g and an average particle size of 7 to 8 nm (Levasil® 300, a product of Bayer AG), which additionally contained 0.15% of a nonionic surfactant (adduct of 7 moles of ethylene oxide with linseed oil fatty acid), was sprayed onto the double-walled panel of Example 1, predried for 2 to 3 minutes at room temperature and then dried once more for 10 minutes at 80° C.

The panel was then fixed to the roof of a model greenhouse at an angle of 60° with the coated size facing downwards so that the water-spreading effect could be compared by observing the formation of droplets. In the model greenhouse, water was evaporated by means of a heat source so that an equilibrium temperature of 50° C./100% air humidity was spontaneously established.

The panel was left under these conditions for 6 hours and then heated for 4 hours at 40° C. in a dry heating cabinet. The procedure in the model greenhouse and in the heating cabinet was then repeated in alternation until the water-spreading effect (as reflected in the formation of droplets on the panel) disappeared.

Result:

|  | Life of the coating (in cycles) |
|---|---|
| Without coupling layer (A) | 13 |
| Coating of Example 1 | >120 |

We claim:

1. Coated moldings comprising a coating (A) which consists of a thermoplastic, aromatic polycarbonate having a thickness of 1 to 200 μm and which contains 4 to 20 % by weight of a compound corresponding to formula (I):

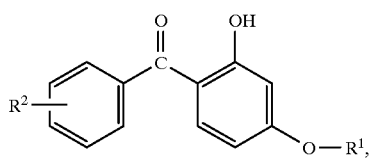

where $R^1$ is $C_{18-30}$ alkyl and $R^2$ is H or $C_{1-12}$ alkyl.

2. A process for producing the coated moldings according to claim 1, the process comprising the step of coextruding the molding and the coating (A) together.

3. The coated moldings according to claim 1, further comprising a coating (B) applied to coating (A), the coating (B) having a thickness of 0.01 to 20 μm and comprising silica, a metal oxide other than silica, or a mixture thereof.

4. A process for producing the coated moldings according to claim 3, the process comprising the steps of coextruding the molding and the coating (A) together, applying the coating (B) to the coating (A) using colloidal solutions of silica, metal oxides other than silica, or a mixture thereof in water or organic solvents, and concentrating the coating (B) by evaporating the water or organic solvents at a temperature of 20 to 140° C.

5. The coated moldings according to claim 1, wherein the thickness of the coating (A) is 1 to 50 μm.

6. The coated moldings according to claim 1, wherein the coating (A) contains 5 to 15% by weight of the compound corresponding to formula (I).

7. The coated moldings according to claim 1, wherein the compound corresponding to formula (I) is:

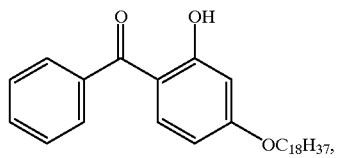

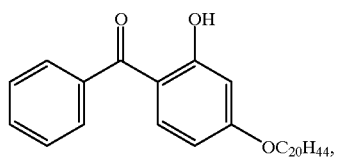

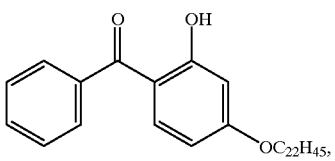

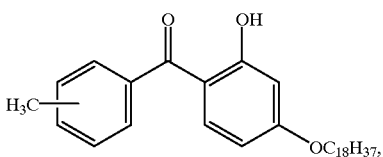

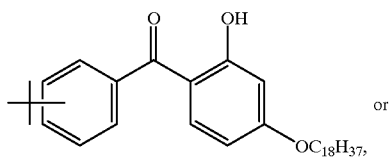

or

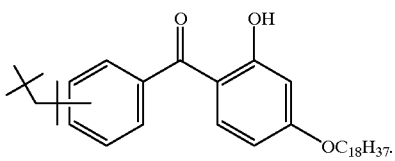

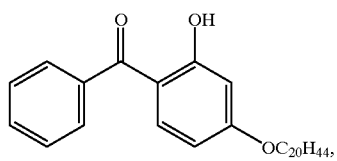

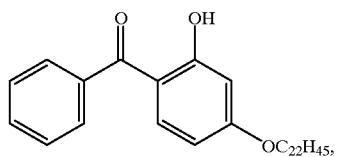

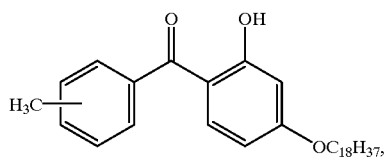

or

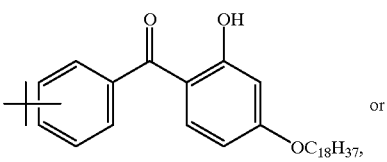

8. The coated moldings according to claim 1, wherein the thermoplastic, aromatic polycarbonate has an average molecular weight of 10,000 to 100,000 as determined by gel chromatography.

9. The coated moldings according to claim 8, wherein the average molecular weight of the thermoplastic, aromatic polycaronate is 15,000 to 50,000 as determined by gel chromatography.

10. A double-walled or solid panel comprising the coated molding according to claim 1.

11. The coated moldings according to claim 3, wherein the thickness of the coating (A) is 1 to 50 μm.

12. The coated moldings according to claim 3, wherein the coating (A) contains 5 to 15% by weight of the compound corresponding to formula (I).

13. The coated moldings according to claim 3, wherein the compound corresponding to formula (I) is:

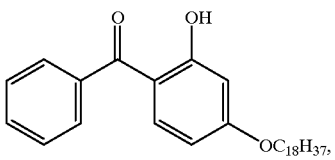

14. The coated moldings according to claim 3, wherein the thermoplastic, aromatic polycarbonate has an average molecular weight of 10,000 to 100,000 as determined by gel chromatography.

15. The coated moldings according to claim 14, wherein the average molecular weight of the thermoplastic, aromatic polycarbonate is 15,000 to 50,000 as determined by gel chromatography.

16. The coated moldings according to claim 3, wherein the thickness of the coating (B) is 0.01 to 5 μm.

17. The coated moldings according to claim 16, wherein the thickness of the coating (B) is 0.01 to 1 μm.

18. The coated moldings according to claim 3, wherein the metal oxide other than silica is the oxide of zinc, aluminum, zirconium, chromium, or tin.

19. A double-walled or solid panel comprising the coated molding according to claim 3.

* * * * *